(12) United States Patent
Hudson et al.

(10) Patent No.: US 8,775,657 B2
(45) Date of Patent: Jul. 8, 2014

(54) SYSTEM AND METHODS OF STREAMLINING MEDIA FILES FROM A DISPERSED PEER NETWORK TO MAINTAIN QUALITY OF SERVICE

(75) Inventors: Michael D. Hudson, Portland, OR (US); Brian L. Windheim, Sherwood, OR (US); Darin Stewart, Hillsboro, OR (US); Sudhir Menon, Portland, OR (US); Mark W. Goschie, Tualatin, OR (US); Glen Curtis Shipley, Portland, OR (US)

(73) Assignee: Sony Corporation (JP)

( * ) Notice: Subject to any disclaimer, the term of this patent is extended or adjusted under 35 U.S.C. 154(b) by 1383 days.

(21) Appl. No.: 11/982,081

(22) Filed: Oct. 31, 2007

(65) Prior Publication Data
US 2009/0049185 A1 Feb. 19, 2009

Related U.S. Application Data

(60) Division of application No. 10/349,755, filed on Jan. 23, 2003, now Pat. No. 8,219,700, which is a continuation of application No. 10/132,954, filed on Apr. 26, 2002, now abandoned.

(51) Int. Cl.
*G06F 15/16* (2006.01)
(52) U.S. Cl.
USPC .......................................................... 709/231
(58) Field of Classification Search
USPC .......................................................... 709/231
See application file for complete search history.

(56) References Cited

U.S. PATENT DOCUMENTS

| | | | |
|---|---|---|---|
| 5,634,124 A | 5/1997 | Khoyi et al. | |
| 5,740,170 A | 4/1998 | Andou et al. | |
| 5,778,187 A | 7/1998 | Monteiro et al. | |
| 5,850,396 A | 12/1998 | Gilbert | |
| 5,864,854 A | 1/1999 | Boyle | |
| 5,884,031 A | 3/1999 | Ice | |
| 5,944,780 A | 8/1999 | Chase et al. | |
| 6,003,045 A | 12/1999 | Freitas et al. | |
| 6,081,898 A | 6/2000 | Miller et al. | |
| 6,339,785 B1 | 1/2002 | Feigenbaum et al. | |

(Continued)

FOREIGN PATENT DOCUMENTS

WO WO-02/076003 A2 9/2002

OTHER PUBLICATIONS

U.S. Appl. No. 10/033,305, filed Oct. 1, 2007, Chapweske.

(Continued)

*Primary Examiner* — Nicholas Taylor
(74) *Attorney, Agent, or Firm* — Lerner, David, Littenberg, Krumholz & Mentlik, LLP

(57) ABSTRACT

Media content, including content suitable for streaming, is distributed to and accessible over a communications network by computer nodes within a peer storage network of computer nodes hosting respective content stores. Discrete portions of a content file are multiply distributed to and persisted in a distributed set of the content stores existing within the storage network such that various content stores persist subsets of the content file portions. A computer node retrieves the discrete portions of the content file from the various distributed content stores, depending on node availability, the particular discrete portions there available, and node and network performance factors sufficient to maintain a minimum quality of service, thereby enabling streaming presentation of the content file on the requesting computer node.

2 Claims, 7 Drawing Sheets

(56) References Cited

U.S. PATENT DOCUMENTS

| | | |
|---|---|---|
| 6,374,289 B2 | 4/2002 | Delaney et al. |
| 6,412,004 B1 | 6/2002 | Chen et al. |
| 6,415,280 B1 | 7/2002 | Farber et al. |
| 6,434,622 B1 | 8/2002 | Monteiro et al. |
| 6,510,553 B1 | 1/2003 | Hazra |
| 6,558,049 B1 | 5/2003 | Shin |
| 6,578,201 B1 | 6/2003 | LaRocca et al. |
| 6,606,717 B1 | 8/2003 | Yu et al. |
| 6,611,530 B1 | 8/2003 | Apostolopoulos |
| 6,633,901 B1 | 10/2003 | Zuili |
| 6,665,726 B1 | 12/2003 | Leighton et al. |
| 6,675,205 B2 | 1/2004 | Meadway et al. |
| 6,697,365 B1 | 2/2004 | Messenger |
| 6,711,622 B1 | 3/2004 | Fuller et al. |
| 6,721,957 B1 | 4/2004 | Lawrence |
| 6,728,271 B1 | 4/2004 | Kawamura et al. |
| 6,728,760 B1 | 4/2004 | Fairchild et al. |
| 6,732,183 B1 | 5/2004 | Graham |
| 6,742,023 B1 | 5/2004 | Fanning et al. |
| 6,757,796 B1 | 6/2004 | Hofmann |
| 6,801,947 B1 | 10/2004 | Li |
| 6,816,909 B1 | 11/2004 | Chang et al. |
| 6,901,604 B1 | 5/2005 | Kiraly |
| 6,907,463 B1 | 6/2005 | Kleinpeter, III et al. |
| 6,954,456 B2 | 10/2005 | Cranor et al. |
| 7,032,000 B2 | 4/2006 | Tripp |
| 7,035,933 B2 | 4/2006 | O'Neal et al. |
| 7,065,548 B2 | 6/2006 | van Oldenborgh et al. |
| 7,072,982 B2 | 7/2006 | Teodosiu et al. |
| 7,089,301 B1 | 8/2006 | Labio et al. |
| 7,133,368 B2 | 11/2006 | Zhang et al. |
| 7,174,334 B2 | 2/2007 | Cherkasova |
| 7,181,523 B2 | 2/2007 | Sim |
| 7,194,549 B1 | 3/2007 | Lee et al. |
| 7,209,437 B1 | 4/2007 | Hodgkinson et al. |
| 7,213,062 B1 | 5/2007 | Raciborski et al. |
| 7,277,950 B1 | 10/2007 | Chapweske |
| 7,363,498 B2 | 4/2008 | Hennessey et al. |
| 7,804,958 B2 | 9/2010 | Kahn et al. |
| 2002/0007417 A1 | 1/2002 | Taylor et al. |
| 2002/0040479 A1* | 4/2002 | Ehrman et al. .......... 725/95 |
| 2002/0076461 A1 | 6/2002 | Schmidt et al. |
| 2002/0078461 A1 | 6/2002 | Boykin |
| 2002/0107968 A1 | 8/2002 | Horn et al. |
| 2002/0116533 A1 | 8/2002 | Holliman et al. |
| 2002/0120925 A1 | 8/2002 | Logan |
| 2002/0131423 A1 | 9/2002 | Chan et al. |
| 2002/0133570 A1 | 9/2002 | Michel |
| 2002/0147774 A1 | 10/2002 | Lisiecki et al. |
| 2002/0152299 A1 | 10/2002 | Traversat et al. |
| 2002/0184357 A1 | 12/2002 | Traversat et al. |
| 2002/0198930 A1 | 12/2002 | Jones et al. |
| 2003/0002521 A1 | 1/2003 | Traversat et al. |
| 2003/0009589 A1 | 1/2003 | Apostolopoulos et al. |
| 2003/0028610 A1 | 2/2003 | Pearson |
| 2003/0028623 A1 | 2/2003 | Hennessey et al. |
| 2003/0031176 A1* | 2/2003 | Sim .............................. 370/392 |
| 2003/0093491 A1 | 5/2003 | Valjakka et al. |
| 2003/0177246 A1 | 9/2003 | Goodman et al. |
| 2003/0191812 A1 | 10/2003 | Agarwalla et al. |
| 2003/0195940 A1* | 10/2003 | Basu et al. ................ 709/213 |
| 2004/0044779 A1 | 3/2004 | Lambert |
| 2004/0236863 A1 | 11/2004 | Shen et al. |
| 2005/0086325 A1 | 4/2005 | Slipp et al. |
| 2005/0091399 A1 | 4/2005 | Candan et al. |
| 2005/0237949 A1* | 10/2005 | Addessi ....................... 370/255 |
| 2006/0015574 A1 | 1/2006 | Seed et al. |
| 2006/0053209 A1 | 3/2006 | Li |
| 2006/0224760 A1 | 10/2006 | Yu et al. |
| 2008/0095079 A1 | 4/2008 | Barkley et al. |

OTHER PUBLICATIONS

Dongyan Xu et al., "On Peer-to-Peer Media Streaming", Purdue University, West Lafayette, IN, Department of Computer Sciences.
BitTorrent (protocol), http://en.wikipedia.org/wiki/BitTorrent_%28protocol%29.
Hung-Chang Hsiao; Chung-Ta King, Nerac, Modeling and Evaluating Peer-To-Peer Storage Architectures, 2002.
Li Xiao; Xiaodong Zhang; Zhichen Xu; On Reliable and Scalable Peer-To-Peer Web Document Sharing, 2002.
Dabek, F.; Kaashoek, M.F.; Karger, D.; Morris, R.; Stoica, I.; Nerac; Wide-Area Cooperative Storage With CFS, Dec. 2001.
Rowstron, A.; Druschel, P.; Storage Management and Caching in Past, A Large-Scale, Persistent Peer-To-Peer Storage Utility; Dec. 2001.
Selvakumar, S.; Prabhakar, P.; Implementation and Comparison of Distributed Caching Schemes; 2000.
Yoav Nebat, Moshe Sidi; Resequencing Considerations in Parallel Downloads, Technion, Haifa 32000, Israel, Electrical Engineering Department, 2002.
Robert Silva, Circuit city's DIVX Format Bites the Dust, Jun. 21, 1999, www.about.com.
Parameswaran et al., "P2P Networking: An Information-Sharing Alternative," Jul. 2001, Computer, vol. 34, No. 7, pp. 31-38.

* cited by examiner

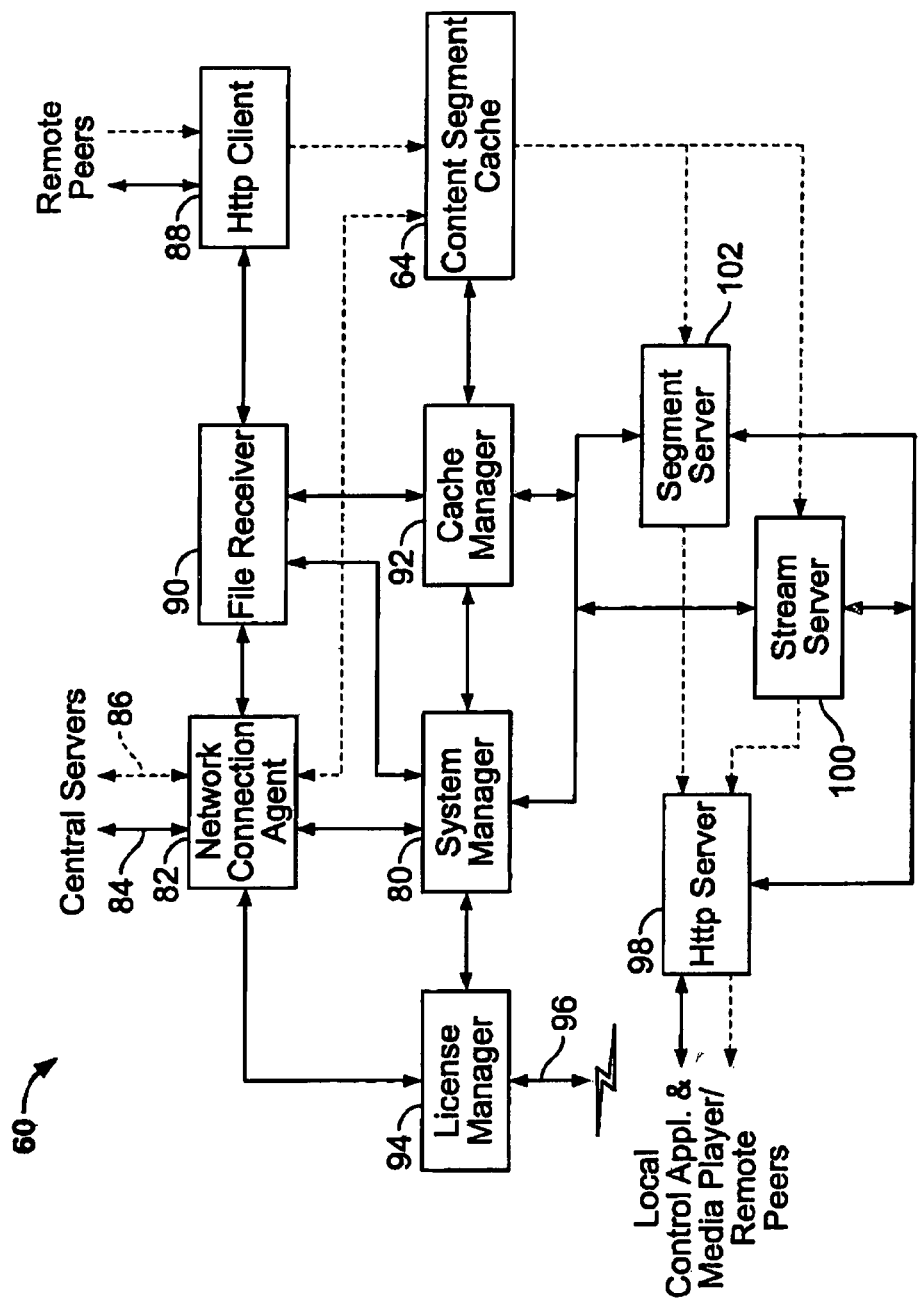

SYSTEM AND METHODS OF STREAMLINING MEDIA FILES FROM A DISPERSED PEER NETWORK TO MAINTAIN QUALITY OF SERVICE

CROSS-REFERENCE TO RELATED APPLICATIONS

This application is a Divisional Application of prior U.S. patent application Ser. No. 10/349,755, filed Jan. 23, 2003 now U.S. Pat. No. 8,219,700; which is a continuation of U.S. patent application Ser. No. 10/132,954, filed Apr. 26, 2002, now abandoned; all of which are incorporated herein by reference in their entirety.

BACKGROUND OF THE INVENTION

1. Field of the Invention

The present invention is generally related to network based content delivery systems and, in particular, to a streaming media content delivery system supporting multiple, concurrent, peer-based sources of multimedia content accessible subject to central mediation.

2. Description of the Related Art

The desire for high-quality, on-demand delivery of streaming multimedia and other rich digital content is a principal driving force in the continued development of the broadband Internet infrastructure. Indeed, with the growth of broadband connections, the number, scale, and diversity of multimedia content servers has rapidly increased. Streaming audio and video files, including entertainment, news broadcasts, and instructional programming are now sourced by a variety of mainstream Internet sites. Content delivery through streaming media is broadly recognized as one of the fastest growing technologies related to the Internet.

Despite the growth in interest and use, conventional content streaming systems have not been cost effective or particularly reliable in delivering high-quality content. Streaming media content, including in particular high-quality audio and video, is naturally bandwidth intensive and fundamentally sensitive to varying delivery latencies. Whether due to transient transport overloads, functional interruptions in the network infrastructure, or bandwidth limitations of a content source site, the result is uniformly perceived by a recipient as a reduction in the quality of service of the content source site.

Because of the open and shared nature of the Internet, few practical mechanisms can ensure the uninterrupted delivery of broadband content, typically consisting of multi-megabyte files, over the entire delivery path from a source site to a recipient. Known schemes include the use of network edge caches distributed at strategic locations within the network infrastructure controlled by an individual service provider. These network edge caches can be operated to significantly reduce the network traffic through the local network space of the individual service provider. Large edge caches are naturally required to store any significant amount of streaming media content. Implementing a useful number of adequately scaled, geographically distributed edge caches requires a large capital infrastructure investment.

Quality of service issues within the domain of individual content source sites are relatively easier to manage. Over the past few years, highly scaled, geographically distributed and even multiply redundant content source system architectures have been developed. Conventionally, these very large-scale systems are considered a baseline requirement to ensure a consistent high quality of service from the source sites. These sites typically employ large-scale server forms, hosting extensive libraries of archived multimedia content, that cumulatively provide sufficient throughput to enable real-time responsiveness and continuous on-demand delivery. Very high-bandwidth Internet connections with sufficient capacity to accommodate peak-demand content access requirements are also required.

Unfortunately, conventional content delivery networks, including fully scaled content server systems and extensive edge cache networks, have not proven adequate to broadly ensure a high quality of service to all potential users of the systems. Ultimately, any media content must be delivered as an effectively continuous stream of multimedia data to the recipient computer. The continuity of the stream must remain within the buffer length tolerance supported by the media player on the recipient computer. Transient bandwidth bottlenecks can certainly occur anywhere beyond the scope of a conventional content delivery network. Bottlenecks and delivery latencies can occur even with the network, particularly whenever the stream data is not immediately available in a locally accessible edge cache. Such bottlenecks in the Internet infrastructure are unfortunately both common and unpredictable.

Transient bandwidth bottlenecks can also occur in within the content server system itself. The rate of content access requests is highly variable with unpredictable demand peaks. Whenever the access rate exceeds the capabilities of the content server system, connection requests, including ongoing streaming data transfers, are dropped or delayed. Whether due to network or server bottlenecks, the resulting latencies and gas in the delivery of stream data packets ultimately to the recipient are uniformly seen as source-site quality of service failures.

Expanding the conventional content distribution networks to prevent significant transient bandwidth bottlenecks is generally recognized as not practical. Due to the size and diversity of the Internet and the growing demands for streaming content delivery, significantly expanding the edge cache network coverage and the capacity of all included edge caches and streaming media source sites is simply not cost-effective. Furthermore, the costs associated with high-bandwidth Internet access and server throughput grow proportional to peak access demands, which is disproportionately greater than the growth of average access demands. Conventionally, a minimum of 50 percent additional access and server bandwidth is required, if not more, to meet peak bandwidth requirements. This additional bandwidth, however, is unused typically in excess of 90 percent of the time. The capital and operating cost of this additional bandwidth is therefore not directly recoverable. Consequently, content sites and the content delivery network operators have been severely limited in being able to consistently and profitably deliver streaming media content with a high quality of service.

Consequently, there is a clear need for a content delivery network architecture that can reliably provide a high quality of service to content stream recipients and that is cost-effective to operate.

SUMMARY OF THE INVENTION

Thus, a general purpose of the present invention is to provide an efficient peer-to peer content distribution network system architecture capable of efficiently providing a high quality of service in the delivery of multimedia data streams to end-users.

This is achieved in the present invention by providing for the distribution of media content, including content suitable for streaming, to computer nodes within a peer storage network of computer nodes hosting respective content stores. The computer nodes enable mutual access to the stored media content over a communications network. Discrete portions of a media content file are distributed and persisted in a distributed set of the content stores existing within the storage network such that various content stores persist potentially differing subsets of the discrete portions of a content file. A computer node retrieves the discrete portions of a content file from various distributed content stores, depending on node availability, the particular discrete portions of the content file there available, and node and network performance factors sufficient to maintain a minimum quality of service, thereby enabling streaming presentation of the content file on the requesting computer node.

An advantage of the present invention is that content is redundantly distributed in the form of discrete segments throughout a peer storage network, permitting retrieval of segments on a best quality-of-service basis determined relative to each computer system that requests a streaming media content file. Multi-source segmented delivery of content also distributes the transport load over multiple content sources while ensuring the availability of multiple sources for all segments. The perceived quality-of-service is both increased and reliably maintained.

Another advantage of the present invention is that centralized mediation of segmented file transfers permits strategic planning of the ongoing segmented file transfer load distribution. Central mediation combined with distributed segments file storage enables the aggregate bandwidth of the content distribution network to be optimally utilized. The complexity and cost of the central content mediation system, including the scale of the network access connections to accommodate worst case usage requirements, are greatly reduced.

A further advantage of the present invention is that the mediation system can perform predictive seeding of the content delivery network and adaptive modification of segment distribution in response to changing content file demands. Historical demand patterns, peer node availability and bandwidth capabilities can be used to guide the strategic distribution of content segments throughout the content delivery network. Planned, periodic updates of the content distribution network segment caches can be used to pre-deliver content segments to multiple strategically selected network caches during off-hours; thus minimizing both seeding and subsequent end-user demand spikes.

Still another advantage of the present invention is that the content distribution network can include a multi-tiered hierarchy of content segment caches, including peer cache nodes, primary content distribution nodes, and seeding servers. Reliable access to content segments is ensured by wide distribution of the content segments within the segment cache storage tiers and across multiple tiers.

Yet another advantage of the present invention is that the central mediation system can be persistently connected to and monitor the state of the available, active peer nodes of the content distribution network. Changes in the availability and supported bandwidth of nodes within the content distribution network are dynamically detected and factored into the ongoing tactical utilization of the content distribution network as mediated by the central server system.

Still another advantage of the present invention is that the distribution of content segments is actively maintained by the mediation server system. The distribution of content segments within the content delivery network, which is continuously subject to redistribution as a consequence of content use requests, is tracked and managed by the mediation server system to strategically adapt the distribution pattern to optimally match demand patterns.

A yet further advantage of the present invention is that proprietary content is continuously protected by a combination of encryption and digital signatures applied to the content files and to the individual content file segments. The mediation server system maintains the integrity of the content file segments throughout the operations of the file segment transport, cache storage, and streaming file assembly and playback. The integrity of content within the content distribution system is thus ensured by the management function of the mediation server system.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 3 is a block diagram of a peer network client system constructed in accordance with a preferred embodiment of the present invention.

DETAILED DESCRIPTION OF THE INVENTION

Figure 1:
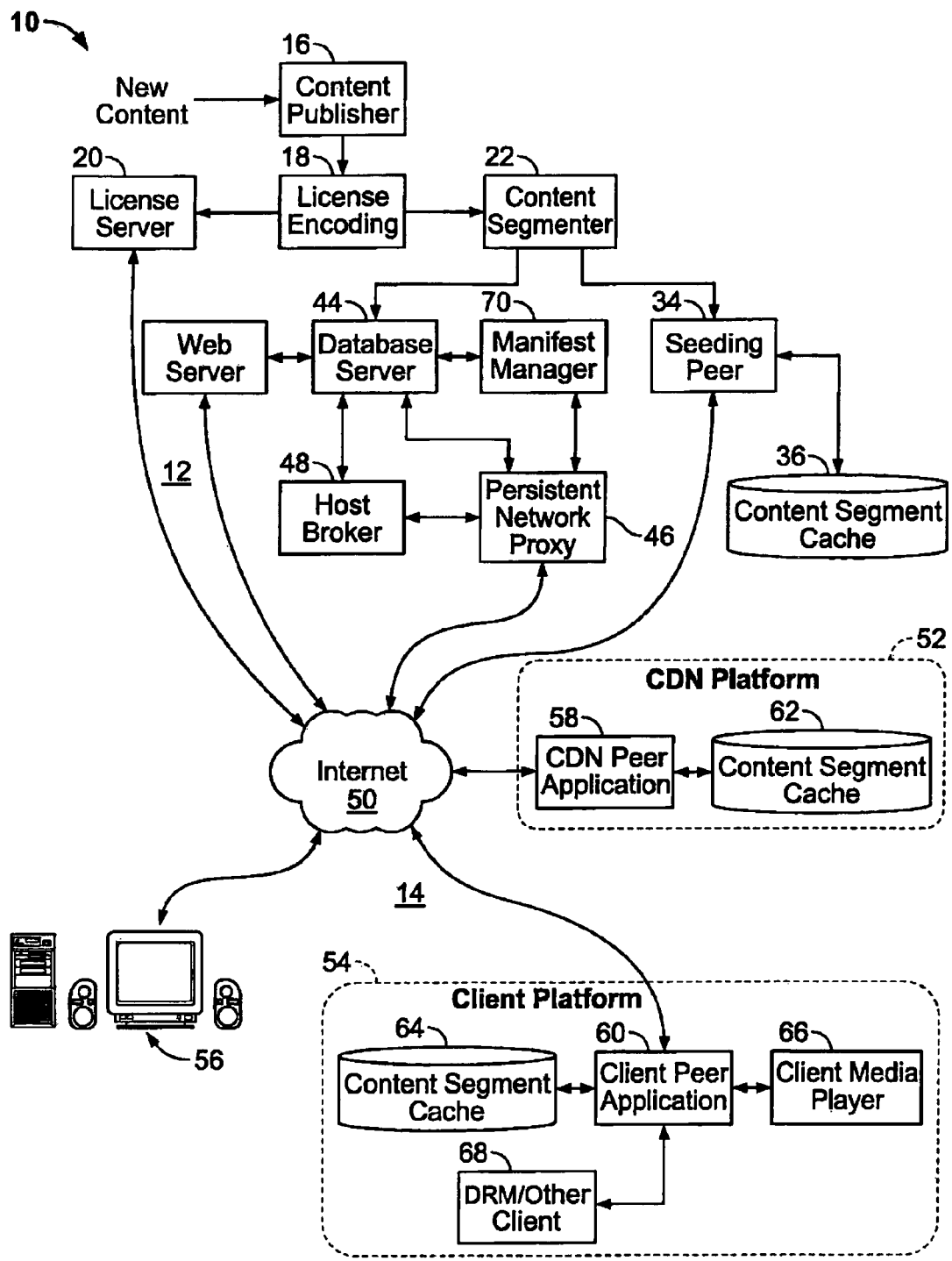
FIG. 1 is a block diagram of a content distribution network organized in accordance with a preferred embodiment of the present invention.

The content distribution network (CDN) of the present invention provides a comprehensive system solution to delivering streaming media and other digital content files to end-user systems with a consistent, high quality of service. The end-user systems participate in a distributed network of peer computer systems, organized into a tiered set of content sources, that store and, on request, selectively forward content to any other peer computer system within the network. The distribution of content and the coordination of content requests is mediated through a centralized server system, which maintains a directory catalog of the available content and of the location of the content within the network.

In the preferred embodiments of the present invention, each unit typically represented by a content file, is segmented into discrete parts that are each uniquely identified in the catalog maintained by the mediation server system. Multiple copies of each segment are preferably distributed to cache stores maintained throughout the network to ensure redundant sources of segments for any requesting peer computer system. The distribution of segments within the network of caches is determined by the mediation server system. While entire sets of segments may be distributed to individual peer computer systems, the mediation server system can also operate to ensure that only fragmentary portions of content units are stored by individual peer computer systems. Through fragmentary storage, the effective security of the corresponding content units is fundamentally increased. The redundant distribution of segments permits transfer of the entire set of segments to a requesting peer with an assured high quality of service.

The mediation server system preferably manages the transfer of content segments within and between the various storage tiers of content distribution network, including content seeding peer computer systems, dedicated content distribution platforms, and end-user client node computer systems. The seeding peers preferably operate as the source of new content segments for distribution to the content distribution network and as ultimate backup sources for segments of requested content. The dedicated content distribution platforms preferably operate as a middle tier for content distribution, affording a greater fan-out of the transfer load in distributing content segments to the end-user client systems. These content distribution platforms may also be used as dedicated sources of proprietary or other content that for licensing or other reasons will not be distributed for persistent storage in the end-user tier of content caches. Finally, the end-user client node tier is typically a highly heterogenous collection of typically independently operated computer systems, each used to host a segment storage cache and to participate on an ad-hoc basis in the content distribution network. Client node systems may support caches of varying size, network connections of varying capacity, and be available on independent schedules.

Requests for selected content units and cache content update requests are submitted to the mediation server through preferably persistent network connections. Manifest lists of the segments may be returned directly or indirectly through an identification of a location within the peer network where a copy of the manifest list is stored. Based on a manifest list, content segments are independently requested by and transferred to nodes of the content distribution system. The peer driven segment retrieval process is cooperatively monitored by the mediation server and, as needed, alternate source locations for segments are provided. Information on the performance of individual peers and the patterns of requests are collected and evaluated on a generally dynamic basis for the generation of request manifest lists. This information is also utilized as a basis for the generation of cache update manifest lists, used to control the background transfer and controlling the storage distribution of content segments throughout the network to optimize the delivery of content in anticipation of demand.

A preferred architecture of a CDN system 10, consistent with the present invention, is shown in FIG. 1. The CDN system 10 preferably includes a central server system 12 and a peer content storage network 14. While logically operating as a centralized system, the various server computer systems that cooperatively function as the central server system 12 can be remotely located, duplicated, and scaled as needed for management, performance and commercial requirements. The operational functions of the central server system 12 include the preparation, including segmentation, of new content for publication, the distribution and management of content segments throughout the peer content storage network 14, monitoring the effective performance and actual content segment transfers between various peer nodes within the content storage network 14, and responding to content and cache update requests.

In the preferred embodiments of the present invention, new content is initially prepared through a content publisher system 16 by encoding or transcoding a new content file or other unit of content to one of several defined media content formats. The currently preferred formats include the Microsoft® WMA streaming media and the Motion Picture Experts Group MPG3 formats. Other formats can be equivalently processed and used. The content file is then encrypted through a license encoding server. In the preferred embodiments of the present invention, a Microsoft digital rights management (DRM) encryption system is utilized to encrypt the content and subsequently manage the serving of licenses by a license server 20. A content unit identifier, uniquely corresponding to the encrypted, encoded content file, and the DRM generated license key are provided to the license server 20.

Figure 2A:
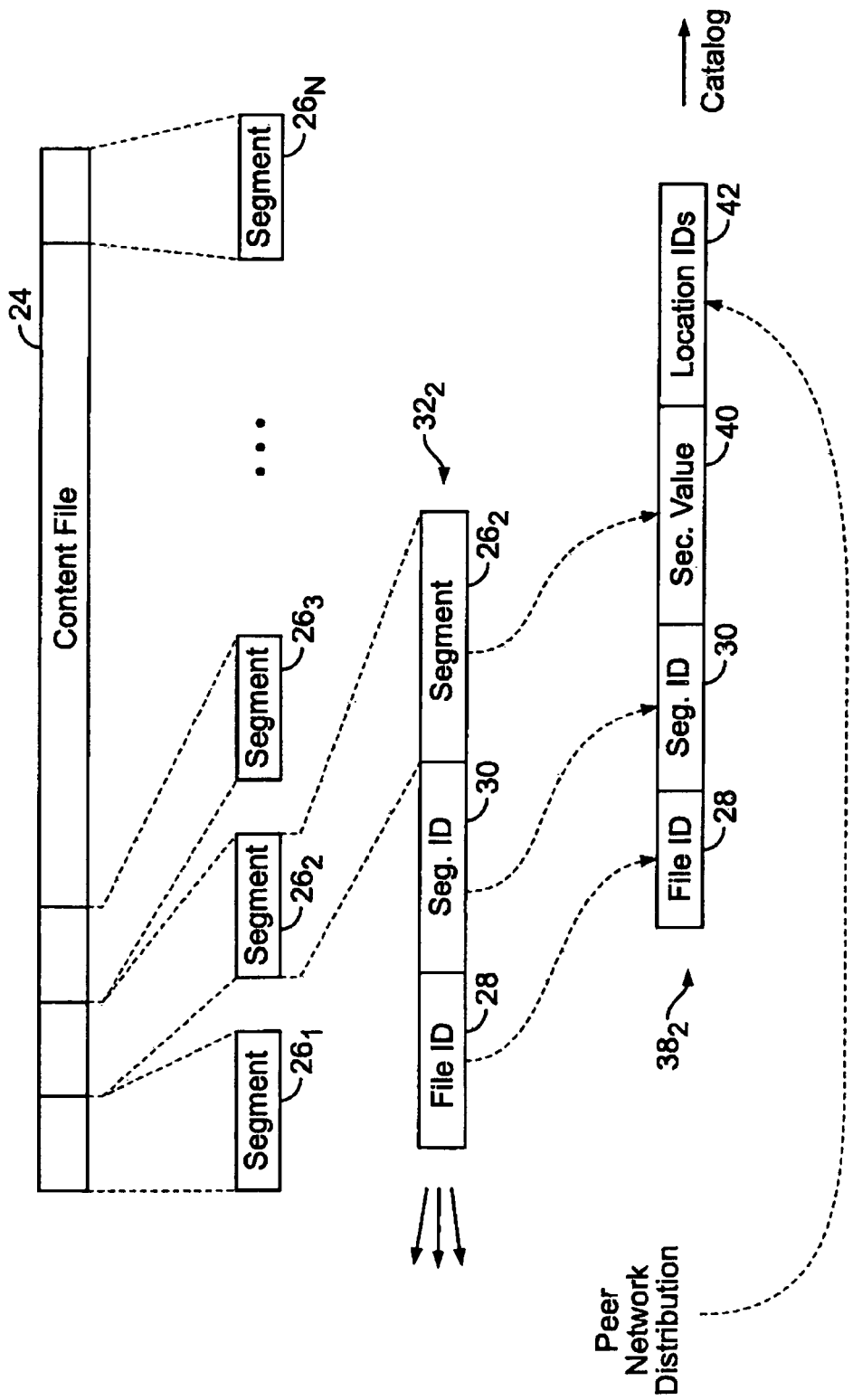
FIGS. 2A and 2B provide detail views of the segmentation of a streaming media content file in accordance with preferred embodiments of the present invention.

Encrypted, encoded content files are segmented by a content segmentation server 22. As illustrated in FIG. 2A, representing a first preferred embodiment, a content file 24 is divided into segments $26_{1-N}$, each with a defined segment size, generally within the range of 25 kilobytes and 2 megabytes and typically on the order of 100 kilobytes. Each segment is then assigned the unique content unit identifier 28 and a segment sequence identifier 30, permitting a particular content file 24 to be reassembled in order from a collection of the content segments $26_{1-N}$. The resulting construction of named segments 32 are then transferred to a seeding peer server 34 and stored in a seeding cache 36 for subsequent distribution further into the peer content storage network 14. Preferably, the seeding peer server 34 is considered part of the peer content storage network 14.

Segment catalog records $38_{1-N}$ are generated in correspondence with the named segments $32_{1-N}$. For named segment $32_2$, the corresponding segment catalog record $38_2$ includes a copy of the content unit identifier 28 and segment sequence identifier 30 of the named segment $32_2$. A security value 40, based on the data content of the segment $26_2$, and a field 42, permitting storage of one or more location identifiers are also included in the segment catalog record $38_2$. Preferably, the security value 40 is an MD5 hash, multi-byte checksum, or other data value signature of the segment $26_2$ sufficient to subsequently authenticate the data integrity of the segment $26_2$.

The location identifiers are preferably surrogate client identifiers assigned to the peer nodes within the content storage network 14. These surrogate client identifiers are preferably resolvable by the central server system 12 to peer network storage cache addresses, preferably in a uniform resource identifier (URI) form. The current URI of a client node can be determined whenever the client node reconnects with the central server system 12. In resolving a location identifier for a client computer system that is currently unavailable, a null URI is returned. Preferably, location identifiers uniquely correspond to peer nodes. In an alternate embodiment, where the location identifier further identifies a particular cache store of named segments 32, the location identifier revolves to a URI identifying a node and cache combination.

The segment catalog records 38 are stored to a content catalog database maintained by a database server 44. As created, the location field 42 of the segment catalog records 38 initially contain only the location identifier of the seeding peer 34. Whenever a named segment 32 is copied to or deleted from a segment cache within the storage content network 14, the location field 42 the corresponding segment catalog record 38 is updated to reflect the current set of location identifiers specifying the content caches from which the segment can be obtained.

In response to a content unit request, the corresponding segment catalog records 38 are prepared and returned as part of a content manifest. In preparing the content manifest, the individual segment catalog records 38 are expanded by resolving the location identifiers to the complete URIs for the referenced named segments 32. The requesting peer thus receives the necessary information to directly retrieve and validate the named segments 32 needed to reconstruct the requested content file 24.

Figure 2B:
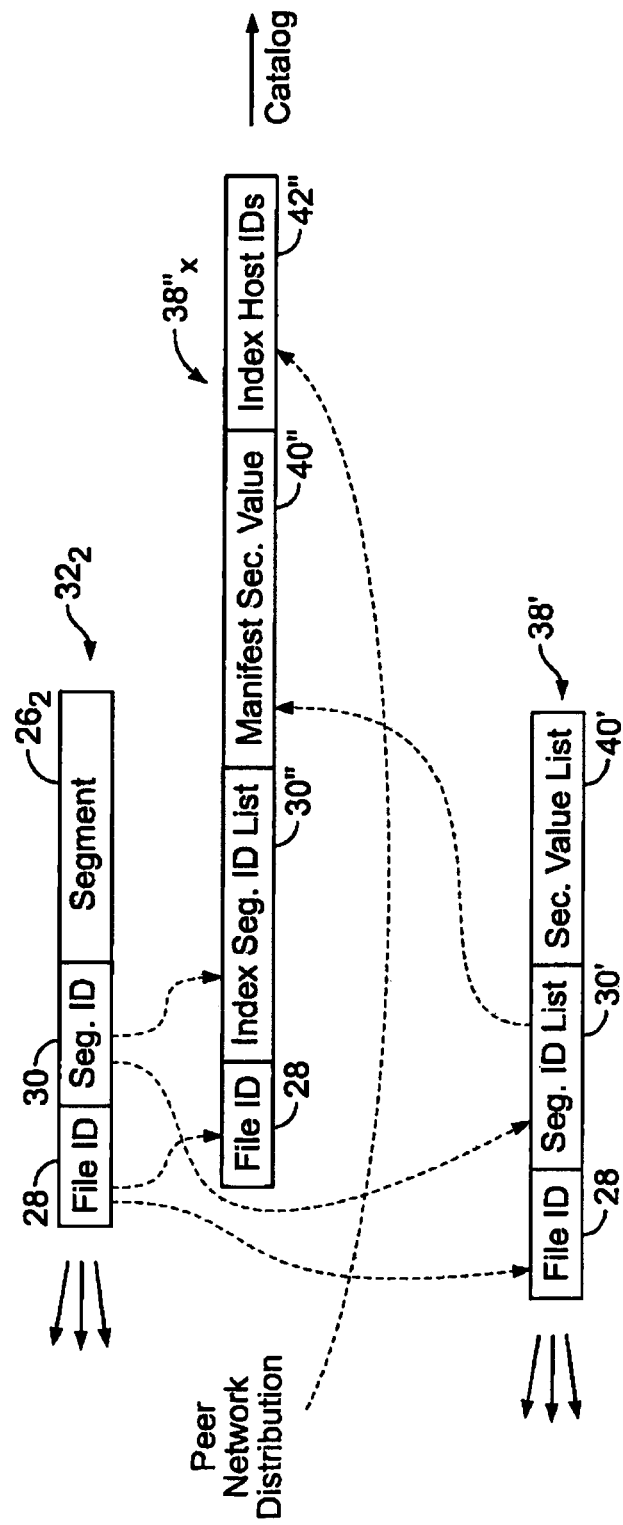

A second preferred embodiment of content segmentation and cataloging is shown in FIG. 2B. As before, named segments 32 are created from the content file 24. Groups of segments, preferably representing contiguous portions of the content file 24 are transferred to the seeding peer 34 and subsequently distributed as segment groups to content segment caches within the content storage network 14.

A content manifest file 38' is generated in combination with the named segments 32. The content manifest file 38' includes the unique content unit identifier 28, a list 30' of the segment sequence identifiers for the named segments 32, and the security values 40' for each of the named segments 32. In the preferred embodiment of the present invention, the content manifest file 38' is distributed as an implied first member of each segment group. Alternately, the content manifest file 38' may be distributed separately through the seeding peer 34 to the content segment caches of selected, typically high availability peer computer systems within the content storage network 14.

A series of manifest catalog records $38''_x$ are also created combination with the named segments 32 and manifest content file 38'. Each manifest catalog record $38''_x$ is established for a respective segment group for the content file 24. A manifest catalog record $38''_x$ includes the unique content unit identifier 28, a list 30'' of the segment sequence identifiers for the corresponding sequence group of named segments 32, a manifest security value 40'', and one or more location identifiers 42'' that specify the content caches storing the corresponding segment group of the content file 24.

The manifest security value 40'' is preferably an MD5 hash, multi-byte checksum, or other data value signature of the content manifest file 38' sufficient to subsequently authenticate the integrity of the content manifest file 38'. Where the content manifest file is separately distributed, an additional set of one or more location identifiers are included with the identification identifiers 42'' to specify available content segment caches that store copies of the content manifest 38'. The location identifiers 42'' as stored by the content catalog are updated as the content manifest 38' and segment groups are copied between and deleted from content segment caches within the content storage network 14.

In response to a content unit request, the manifest catalog records $38''_x$ are returned to the requesting peer computer system. The location identifiers 42'' are expanded URIs prior to returning the manifest catalog record 38''. The requesting peer computer system can then obtain a copy of the manifest content file 38' and validate the copy against the manifest security value 40''. Individual named content segments 32 can then be requested from any peer computer system that persistently stores an encompassing segment group.

This second preferred embodiment of content segmentation and cataloging is presently preferred based on the reduced load incurred by the central server system 12. The content manifest file 38', due at least to the number and size of included security values 40', may be an appreciable fraction of the-size of the corresponding content file 24. Distribution and retrieval of the content manifest file 38' from the content storage network 14 greatly reduces the file transfer load imposed on the central server system 12.

In the preferred embodiments of the present invention, the central server system 12 supports persistent connections established between the remotely distributed nodes of the peer content storage network 14 and a persistent network proxy server 46. The persistent connections are preferably initiated by a client node of the peer connection storage network 14 to a defined TCP/IP socket supported by the persistent network proxy server 46. These persistent connections are utilized to permit peer nodes to supply the central server system 12 with a then current surrogate client identifier, report status and performance information from the peer connection storage network 14 to the central server system 12 and to request and obtain manifests.

In the absence of specific activity, as an ongoing background activity, active client nodes utilize the persistent connections to signal a continuing availability to participate in segment data transfers within the peer content storage network 14. In response to activity, client nodes also report outbound segment transfer load levels and other performance indicators affected by ongoing peer network, participation, including any communication failures that may occur. Client nodes actively performing inbound segment data transfers from other nodes of the peer connection storage network 14 preferably also utilize the persistent connections to report network data transfer rates and latency information against other identified client nodes. The persistent network proxy server 46 preferably collects and records this status and performance information in a network status database maintained by the database server 44. The data contained with the network status database, in effect, represents peer network map useful to plan use of the peer content storage network 14.

Content unit requests, as submitted by the client nodes, are directed through the persistent network proxy server 46 to a host broker server 48. Each content unit request provides the unique content unit identifier for the requested content unit. A search of the content catalog database locates the catalog records corresponding to the content segments necessary to construction the requested content unit. The referenced locations identifiers are evaluated against the performance information represented by the network peer network map to select an optimal, redundant set of content segments. This evaluation preferably reflects a load-balancing of the ongoing segment data transfer demands on the potentially participating nodes of the peer connection storage network 14. The evaluation also considers the reported network data transfer rates between the requesting client node or similarly situated client nodes and the potentially participating nodes. As a product of the evaluation, the host broker server 48 can produce a content records listing a set of content segments, collectively representing the requested content unit, that can be retrieved from specified locations within the peer content storage network 14. The specified locations determined by the host broker server 48 thus collectively represent a mediated balancing of the need to broadly distribute the system-wide content segment transfer load across the available peer network nodes and ensure effectively uninterrupted delivery of each requested content unit to the requesting peer nodes.

Preferably, complete content manifest-based working specification of the requested content unit is dynamically constructed by a requesting client node. The content manifest file is retrieved either from another client node or through the host broker server 48. Based on the segment catalog records $38''_x$ or the segment group index records $38''_x$, including the content unit and segment sequence identifiers, segment security values, and the expanded location identifiers 42, 42'', the working content manifest is constructed by the client node. Preferably, the expanded location identifiers are presented in a priority ordered by segment sequence number and relatively preferred location from which to transfer the segment as determined by the performance and load-balancing evaluation performed by the host broker server 48.

The distribution of named content segments 32 throughout the peer connection storage network 14 is, in the preferred embodiments of the present invention, actively performed by the peer nodes of the peer connection storage network 14. Named content segments 32 are placed by a content segmentation server 22, individually or as members of segment groups, in the content segment cache 36 of one or more seeding peer servers 34. The named content segments 32 are then dispatched typically through the internet 50 in response to peer node requests to various dedicated content distribution network platforms 52, client node platforms 54,56, and potentially other seeding servers 34.

Preferably, all peer nodes within the peer connection storage network 14 implement content servers, such as peer node applications 58, 60, to support the network transfer of named content segment 32 between respective local content segment caches 36, 62, 64. The progressive distribution, including redistribution, of named content segments 32 is predominately effected by the peer node applications 58, 60 and any secondary seeding peer servers 34 directly requesting sets of named content segments 32 for storage in the associated content segment caches 36, 62, 64. Additional distribution and redistribution of named content segments 32, again individually or as members of segment groups, follows from the on-demand transfer of the named content segments 32 of content units requested by individual client nodes. As named content segments 32 are received by a requesting client node 54, a copy is stored at least transiently in the associated content segment cache 64 pending streaming to a client media player 66.

Strategic control over the distribution of the named content segments 32 is preferably performed by a manifest manager server 68. In accordance with the present invention, at least the dedicated content distribution network platforms 52 and client node platforms 54, 56 periodically issue cache update manifest requests to the central server system 12 through the persistent connections with the network proxy server 46. Cache update manifest requests are also preferably issued on each initiation of a persistent connection. A content unit request may also be treated as a cache update manifest request.

In the preferred embodiments of the present invention, the manifest manager server 50 determines a distribution patters of named content segments 32 based on an ongoing analysis of the peer network map, a log of the recent content unit requests and segment transfers, as stored by the broker server 48 to the database server 44, and optionally constraints and hints provided by central server system 12 administrators. In general, the goal of the analysis is to maximize the availability of named content segments 32 to likely requesting peer nodes over network connections of sufficient, reliable bandwidth, subject to the segment cache storage size, load limitations, and reported peer node relative network connection bandwidth of individual peer nodes. While, in a present implementation, this dynamic analysis is performed on a progressive batch basis, a near real time evaluation and analysis of the collected data is preferred.

Constraint information may be employed in the analysis to restrict the distribution of the named content segments 32 of particular content units to defined dedicated content distribution network platforms 52, as may be externally determined appropriate for certain types of content. Constraint information may also specify language or other meta-data attributes of content units that can be actively considered in the analysis to determine an appropriate distribution pattern for content units. Other constraint information may be provided to specify periods within which specific content units will be available, permitting controlled, progressive distribution of content segments prior to a release date and subsequent retirement after a close date.

Hinting information is preferably provided to the manifest manager 70 to peremptorily drive the distribution of named content segments 32. The hinting information may be specified in terms of the priority and prevalence of the distribution of named content segments 32 corresponding to particular content units. The prevalence hints may indicate desired levels of redundant copy distribution over geographic and other domains. Alternately, or in addition, the hinting information may be specified by associating empirical and historically-derived distribution patterns with specified content units. Particularly in the case of historically-derived patterns, the distribution of previously distributed content units can be used as a reference for projecting the likely demand distribution of newly released content units.

The central server system 12 preferably includes one or more web servers 72, which may be geographically distributed, to provide typically end-user accessible interfaces for the selection of content units. The web servers 72 connect through network connections to the database server 44 to obtain browsable and searchable lists of the content units available through the mediating operation of the central server system 12. In accordance with the present invention, select web servers 72 may be designated as the sole or limited selection source for defined content units. Consequently, these select web servers 72 may be operated as the apparent source of proprietary or branded content, at least from the perspective of end-users, yet obtain the full use and benefit of the CDN system 10 in distributing the proprietary and branded content units.

A preferred embodiment of a peer application 60 is detailed in FIG. 3. Executed as a component of a system application on a client platform 54, a system manager 80 implements the top-level procedural logic of the peer application 80. A network connection agent 82 provides a persistent proxy interface to the network proxy 46, supporting the bidirectional transfer of control messages 84, such as content unit and cache management requests, and data 86, including request and cache update manifests. Named content segments 32 are requested and received, in a preferred embodiment of the peer application 60, through an HTTP client component 88 from remote peers. A file receiver component 90, supervised by the system manager 80, performs the detailed transfer control of data files and named content segments 32 through the connection agent 82 and HTTP client 88 relative to a local content segment cache 64.

As each named content segment 32 is received, a security value is regenerated based on the data of contained segment 26 and compared against a corresponding security value 40, 40', as provided in the current request or cache update manifest. A comparison failure with the security value 40, 40' indicates a corrupt named content segment 32, which is discarded. Valid named content segments 32 are stored to a content segment cache 64 under the management control of a cache manager component 92 and the system manager 80. Preferably, the content segment cache 64 is encrypted subject to a DRM license. Accesses to the named content segments 32 require an encryption key acquired through a license manager component 94, which provides an interface 96 to a conventional DRM client 68 and, as required through the connection agent 82, to the remote license server 20.

The peer application 60 preferably implements an HTTP server 98 to provide conventional streaming content connectivity to an external client media player 66 or other streaming media content client. A streaming content component 100 coordinates between the system manager 80, for initial set-up of the content streaming session, and the cache manager 92, for the ordered retrieval of named content segments 32 corresponding to a requested content unit. Retrieved named content segments 32 are progressively passed by the streaming server 100 from the local content segment cache 64 to the HTTP server 98 for relay to a media player 66.

The HTTP server 98 also supports named content segment 32 transfer requests from other peer nodes of the peer connection storage network 14. A segment server component 102 is utilized to manage named content segment 32 transfers, subject to segment transfer session management performed by the system manager 80. The transfer of named content segments 32 to the HTTP server 98 is coordinated by the segment server 100 with the cache manager 92 for selection of the request identified named content segments 32 from the content segment cache 64.

Figure 4:
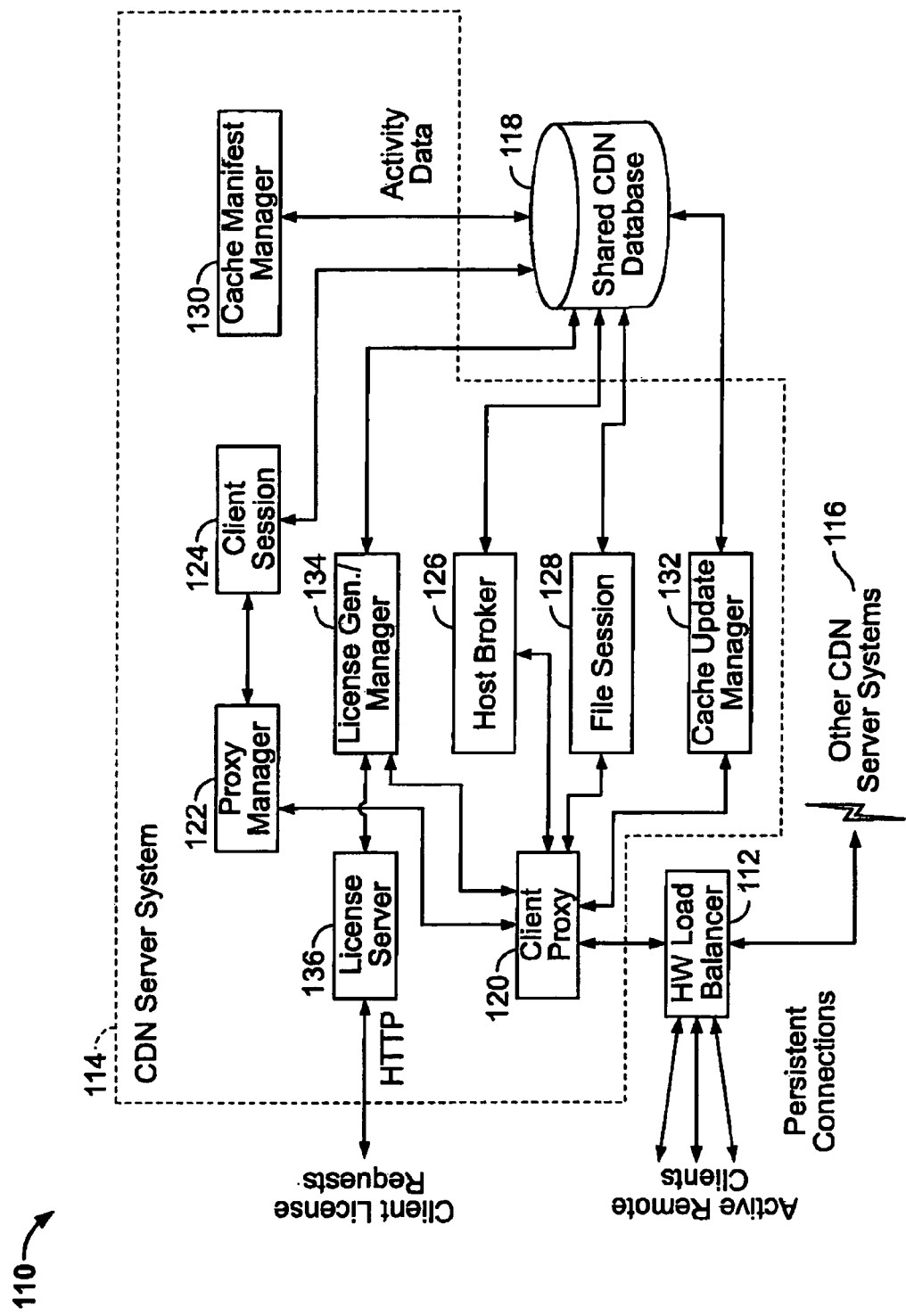
FIG. 4 is a block diagram of a peer network mediation server system constructed in accordance with a preferred embodiment of the present invention.

A preferred architecture 110 of a content delivery network central server system 12, exclusive of segment preparation and publication components, is shown in FIG. 4. A conventional hardware-based network connection load balancer 112 supports a scalable set of CDN server systems 114, 116. Each CDN server systems 114, 116 implements a set of executable server components that are implemented on one or more conventional network connected server computer systems. The CDN server systems 114, 116 share access to a CDN database 118 configured to store OLTP accessible data and an archive database providing storage of recently logged and historical data that can be used for analytic and reporting purposes.

A client proxy component 120 maintains the direct socket connections for the persistent client sessions established against the active peer nodes of the peer connection storage network 14. A startup message is received by the client proxy component 120 from ach peer node upon joining the peer connection storage network 14. Completion messages are received as different processes are completed by the peer nodes.

A proxy manager 122 monitors the connections established with the client proxy component 120 to maintain a data structure representing the peer nodes that are currently active and accessible. Periodic status messages are exchanged to actively monitor the state of the connected peer nodes. Failures in the status exchange are preferably analyzed with the result of redirecting a peer mode to another CDN server system 114, 116, which may be able to establish a more reliable network connection, or the connection is disconnected and the peer node is identified as inactive.

A client session component 124 establishes defined contexts for communications with each of the peer nodes connected to the client proxy 120. Within each context, information is gathered through various progress, status, and logging messages received from the peer nodes. The collected information, as well as the activity state information managed by the proxy manager, is stored to the CDN database 118 for subsequent use in performance analysis and activity reporting.

A host broker component 126 receives, through the client proxy 120, the peer node content unit requests. Through OLTP database accesses, the host broker determines an optimal set of peer nodes from which the requesting peer node can download the named content segments 32 corresponding to the requested content unit. Preferably, the host broker selects all active peer nodes that store named content segments 32, individually or in segment groups, of the requested content unit and then orders identical copies of the named content segments 32 by the load level of the source peer node and the evaluated connection speed between the source and requesting peer nodes. The top segment catalog record 38, 38" entries for named content segments 32 are selected and provided in one or more request catalog messages that are then returned to the requesting peer.

A file session component 128 actively monitors the ongoing named content segment 32 download and streaming operations of the individual peer nodes within corresponding client sessions. In conjunction with the host broker component 126, a unique file session identifier is provided in each content unit request manifest. When a streaming content unit transfer is terminated, the peer node provides a session finished message to the file session component 128. A file session finished message is also provided when a peer node has completed a content segment cache update, based on a provided cache update manifest.

A file session finished message includes the request or cache update manifest corresponding file session identifier and information detailing the required transfer time, number of source peer nodes used, and other statistically relevant information. Network communications failures with particular source peer nodes and other error conditions are also reported. The acquired information is stored to the CDN database 118 for subsequent use in performance analysis and activity reporting.

A cache manifest manager 130 is responsible for establishing the distribution of named content segments throughout the peer connection storage network 14. The collected information stored by the CDN database 118 is periodically evaluated on a daily or shorter basis. Newly available content units, as represented by stored segment catalog records 38, are considered in the evaluation. An updated distribution plan is ultimately produced and stored by the cache manifest manager 130 to the CDN database 118.

A peer cache update manager 132 is responsive to cache update manifest requests, as periodically issued by the peer nodes. Based on the segment distribution plan determined by the cache manifest manager 130 and preferably further qualified by recognition of the ongoing named content segment 32 transfers dynamically reported to the file session component 128, a cache update manifest specific to the requesting peer node is generated and returned.

A license manager component 134 is responsive to license request messages issued by client nodes in connection with content unit requests. The request manifest, in addition to providing a requisite set of segment catalog records 38, preferably identifies the type of licensing encryption, if any, applied to the requested content unit. A license request message includes the request corresponding content unit identifier 28, a license location identifier, which specifies the licensing authority for the requested content and requesting client node, and the license type identifier.

The specified license type permits the license manager 134 to validate the requested content unit license against the typically external licensing authority. In the preferred embodiments of the present invention, the license manager 134 utilizes a conventional Microsoft digital rights manager. Where validated, a license key is generated by the license manager 134 and provided to a license server 136. The license is thus available to the client media player 66 for use in decrypting the streaming media content unit as received through the client peer application 60. A license response message is also returned through the client proxy 120 to the requesting peer node in response to the license request message. The license response message either acknowledges the availability of the license key or provides a validation failure explanation.

Figure 5:
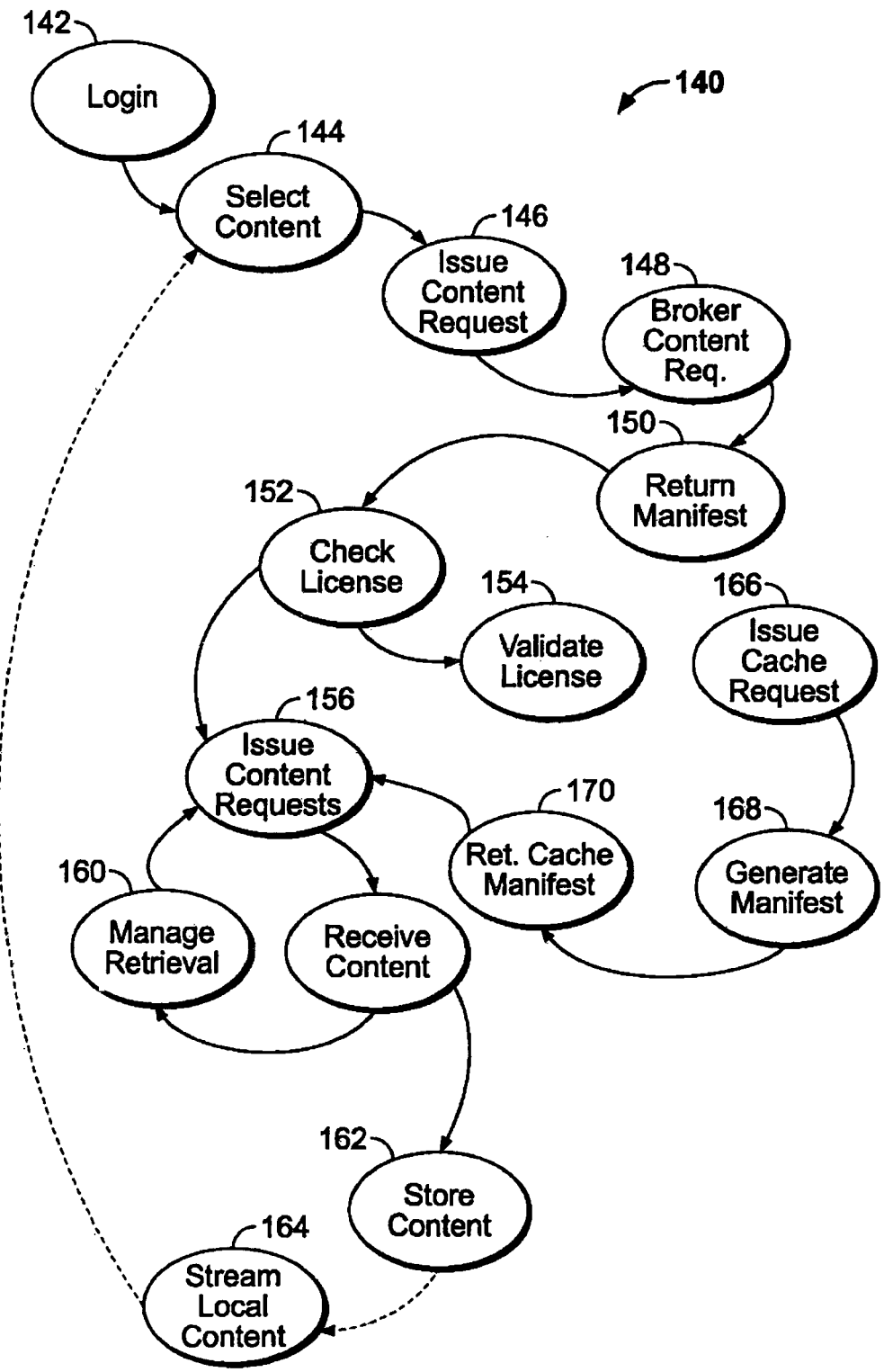
FIG. 5 is a flow diagram of a streaming media content file transfer executed with respect to a peer network client system in accordance with a preferred embodiment of the present invention.

The preferred process 140 implemented by a client peer application 60 is shown in FIG. 5. In connection with the execution of the peer application 60, a client media player 66, Web browser or other client application, executed on the client platform 54, permits an end-user to select and login 142 to a chosen Web server 72. Preferably, a list of available content units is displayed for selection 144 by the end-user. Based typically on an end-user selection, a content unit request is issued 146 to the CDN server system 114 currently supporting the persistent connection to the peer application 60. The content unit request is brokered 148 and a request manifest 150 is returned.

Upon receipt of the request manifest, the client peer application 60 determines whether an encryption license applies to the requested content unit. A license validation 154 is obtained where required. The segment catalog records 38, 38" provided by the request manifest are parsed and corresponding named content segment 32 transfer requests are progressively issued 156 to the segment catalog record 38, 38" identified peer nodes. As the requested named content segments 32 received 158, the integrity of each named content segment 32 is checked 160. Valid named content segments are preferably at least transiently stored 162 to the content segment cache 64. An updated cache update manifest provided in combination with the request manifest can determine which named content segments 32 are to be persistently retained in the content segment cache 64. Named content segments 32 that fail the integrity check are re-requested from the same or an alternate peer node.

In the preferred embodiments of the present invention, once at least the initial named content segment 32 has been received, streaming 164 of the requested content unit is enabled to the attached client media player 66. As permitted by the client media player 66, Web browser or other client application, a new content unit can be selected 144 at any time, terminating the current transfer, and causing a new content unit request to be issued 146.

Periodic updates of the content segment cache 64 are scheduled by the client peer application 60. Cache update requests are preferably issued 166 automatically by the peer application 60 to the current connected CDN server system 114. A cache update manifest is generated 168 and returned 170 to the requested client peer application 60. The cache update manifest is parsed by the client peer application 60 to identify any named content segments 32, as specified by corresponding segment catalog records 38, that are not currently stored by the content segment cache 64. Requests for the non-resident named content segments are issued 156 and the named content segments 32 are received 158 and stored 162 to the content segment cache 64.

In an alternate embodiment of the present invention, the cache update manifest provides meta-information that is used by the client peer application 60 to qualify cache update operations. The cache update manifest meta-information is utilized to specify the schedule of cache update requests and the location of the CDN server system 114, 116 to use as the target of the next cache update request. The meta-information may also be provided to specify a delay schedule for issuance of named content segment 32 transfer requests. This allows the cache update manager 132 to fully mediate the data transfer load on the peer content storage network 14 both in terms of selecting the transfer source peer nodes utilized and the temporal distribution of the load imposed on those nodes. Such mediation is particularly valuable to optimally schedule the load placed on the seeding peers 34 and dedicated CDN platforms 52 particularly where the peer content storage network 14 includes a large number of peer nodes.

Figure 6:
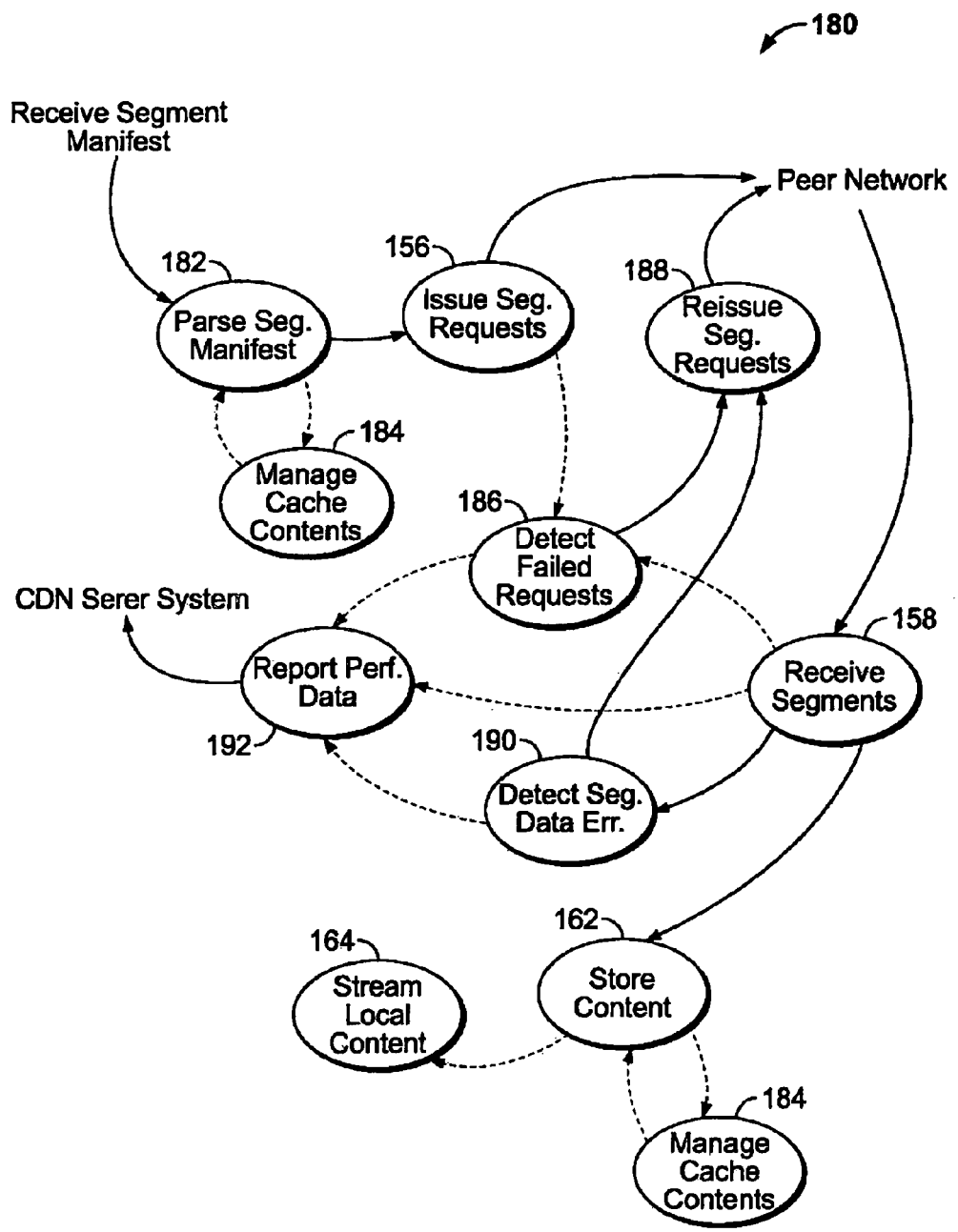
FIG. 6 provides a detailed flow diagram of the adaptive request process implemented in a peer network client system constructed in accordance with a preferred embodiment of the present invention.

The managed client peer process 180 of named content segment request and retrieval is shown in greater detail in FIG. 6. The contents of request and cache update manifests, including meta-information, are initially parsed 182 upon receipt of the manifests. Deferred operations are preferably handled through a periodic re-parsing of the manifests at the deferred time intervals. In anticipation of the receipt of new named content segments 32 beyond a client platform 54 defined cache size, named content segments 32 no longer identified in the current cache update manifest are deleted 184 from the content segment cache 64.

Preferably, multiple named content segments 32 are requested 156 concurrently from the peer content storage network 14. Each concurrently requested named content segment 32 is also redundantly requested from multiple peer node locations. The total number of concurrent named content segment 32 transfers allowed is a dependent on the maximum acceptable load permitted on the client platform 54. Excluding the redundant transfers, a default limit is set at four concurrent transfers of unique named content segments 32. As redundant copies of named content segments are received 158, the transfer bandwidths of each are monitored. Once a reasonably stable gauge of the transfer bandwidths can be determined, adjusted potentially for different transfer start times and the anticipated remaining length of the named content segment 32, only the highest bandwidth transfer for each named content segment 32 maintained. A failure to complete any of these remaining transfers is detected 186. A severe reduction in the transfer bandwidth is also preferably treated as a transfer failure. Redundant requests for the same named content segment 32 are again reissued 188 to multiple peer node locations determinable from the manifests.

Named content segments 32 are stored 162 to the content segment cache 64 as received 158. A security value for the segment data may be accumulated as the named content segment 32 is received or computed once the named content segment 32 once the transfer is completed. The actual security value is then compared 190 to the security value 40 provided in the corresponding segment catalog record 38. On a comparison failure, the received named content segment 32 is deleted from the content segment cache 64. Redundant requests for the named content segment 32 are again reissued 188.

Preferably, detailed information, including the connection latency, average bandwidth and the reliability of transferring named content segments 32 relative to the requesting client platform 54, is collected by the client peer application 60. Information detailing transfer failures and data integrity failures, along with the identity of the peer nodes participating in the failed transactions, is also collected. The performance information is reported to the connected CDN server system 114, 116, preferably in connection with the transfer completion of each content unit transfer and cache update.

Thus, an efficient peer-to-peer content distribution network system architecture capable of efficiently providing a high quality of service in the delivery of multimedia data streams to end-users has been described. While the present invention has been described particularly with reference to operation over the public Internet, the present invention is equally applicable to the distribution over other public and private communications networks. Additionally, the present invention is also applicable to the rapid and efficient distribution of digital information that may have use other than as streaming media content.

In view of the above description of the preferred embodiments of the present invention, many modifications and variations of the disclosed embodiment will be readily appreciated by those of skill in the art. It is therefore to be understood that, within the scope of the appended claims, the invention may be practiced otherwise than as specifically described above.

The invention claimed is:

1. A method of operating a distributed streaming media storage system to support delivery of streaming media files to requesting computer systems, said method comprising the steps of:
   a) recording the segmenting of streaming media content files into pluralities of named content segments including authentication values for said named content segments;
   b) monitoring the distribution, for purposes of persistent storage, of said pluralities of content segments to a plurality of distributed network computer systems interconnected by a wide area communications network permitting individual transport of named content segments;
   c) responding to a request for a predetermined streaming media content file by providing a manifest containing an identification of a subset of said plurality of distributed network computer systems from which to obtain through said wide area communications network of set of named content segments comprehensive of said predetermined streaming media content file, said manifest further containing said authentication values for said set of named content segments.

2. The method claim 1 wherein said identification specifies alternative distributed network computer systems to ensure that the entirety of said set of named content segments can be obtained with sufficient expediency to support streaming presentation of said streaming media content file substantially concurrent with transport of said named content segments.

* * * * *